United States Patent
Guo et al.

(10) Patent No.: US 12,348,797 B2
(45) Date of Patent: Jul. 1, 2025

(54) METHOD FOR IMPLEMENTING CODING AND DECODING OF YUV444 IMAGE ON BASIS OF H.265

(71) Applicant: Guangdong Baolun Electronics Co., Ltd., Guangdong (CN)

(72) Inventors: Hongmeng Guo, Guangdong (CN); Changhua Zhang, Guangdong (CN); Zhenghui Zhu, Guangdong (CN); Dingjin Zhao, Guangdong (CN)

(73) Assignee: Guangdong Baolun Electronics Co., Ltd., Guangzhou (CN)

( * ) Notice: Subject to any disclaimer, the term of this patent is extended or adjusted under 35 U.S.C. 154(b) by 33 days.

(21) Appl. No.: 18/406,877

(22) Filed: Jan. 8, 2024

(65) Prior Publication Data

US 2024/0205471 A1 Jun. 20, 2024

Related U.S. Application Data

(63) Continuation of application No. PCT/CN2021/122610, filed on Oct. 8, 2021.

(30) Foreign Application Priority Data

Jul. 8, 2021 (CN) .......................... 202110772406.1

(51) Int. Cl.
*H04N 21/23* (2011.01)
*H04N 1/60* (2006.01)
*H04N 21/234* (2011.01)
*H04N 21/2343* (2011.01)
*H04N 21/4402* (2011.01)

(52) U.S. Cl.
CPC ......... *H04N 21/234372* (2013.01); *H04N 21/23418* (2013.01); *H04N 21/440272* (2013.01)

(58) Field of Classification Search
CPC ..... H04N 21/234372; H04N 21/23418; H04N 1/6005
USPC .................................................. 375/240.01
See application file for complete search history.

(56) References Cited

U.S. PATENT DOCUMENTS

2021/0304356 A1* 9/2021 Delattre .............. A63F 13/53

FOREIGN PATENT DOCUMENTS

| CN | 102984512 A | 3/2013 |
|---|---|---|
| CN | 104919804 A | 9/2015 |
| CN | 112929624 A | 6/2021 |

* cited by examiner

*Primary Examiner* — Jeffery A Williams
(74) *Attorney, Agent, or Firm* — Muncy, Geissler, Olds & Lowe, P.C.

(57) ABSTRACT

A method for implementing the coding and decoding of a YUV444 image on the basis of H.265 includes acquiring a 1080p YUV444 image, and extracting a Y component, a U component and a V component from the 1080p YUV444 image; dividing a target image into 4 areas, wherein the 4 areas are denoted as a first area, a second area, a third area and a fourth area; and successively using the Y component, the U component and the V component of the 1080p YUV444 image as a Y component of the first area, a Y component of the second area and a Y component of the third area. With the method, the coding and decoding of an image can be implemented on the basis of H.265, and image definition can be improved.

5 Claims, 2 Drawing Sheets

| First area | Second area |
|---|---|
| Third area | Fourth area |

FIG. 2

METHOD FOR IMPLEMENTING CODING AND DECODING OF YUV444 IMAGE ON BASIS OF H.265

CROSS REFERENCE TO RELATED APPLICATIONS

This application is a Continuation of co-pending International Application No. PCT/CN2021/122610, filed on Oct. 8, 2021, for which priority is claimed under 35 U.S.C. § 120; and this application claims priority of Application No. 202110772406.1 filed in China on Jul. 8, 2021 under 35 U.S.C. § 119; the entire contents of all of which are hereby incorporated by reference.

TECHNICAL FIELD

The present application relates to the technical field of coding and decoding of a YUV444 image, and particularly relates to a method for implementing coding and decoding of a YUV444 image on basis of H.265.

BACKGROUND

The existing H.265 codec conducts coding and decoding based on images in YUV420 format. Compared with a YUV444 image, a YUV420 image has 4 Y components (i.e., brightness components) and 2 chromaticity components (comprising 1 U component and 1 V component) in every 4 pixels, so image quality (mainly in a chromaticity aspect) is lower than that of the YUV444 image. A Y component, a U component and a V component are called a luminance component, a blue chromaticity component and a red chromaticity component successively. Therefore, to improve image quality, YUV444 coding is needed. However, the existing H.265 codec implements image coding and decoding based on the YUV420 image. The H.265 codec can implement transmission of a 4K image. Therefore, it is necessary to improve a resolution (such as 4K) and simultaneously improve image quality (such as color information degree), and it is necessary to implement the method for implementing coding and decoding of a YUV444 image on basis of H.265.

SUMMARY

In view of the defects in the prior art, the purpose of the present application is to provide a method for implementing coding and decoding of a YUV444 image on basis of H.265, which can solve a problem of improving image quality.

A technical solution to realize the purpose of the present application is: a method for implementing coding and decoding of a YUV444 image on basis of H.265 comprises the following steps:

acquiring a 1080P YUV444 image, and extracting a Y component, a U component and a V component from the 1080P YUV444 image;

dividing a target image into 4 areas, wherein the 4 areas are denoted as a first area, a second area, a third area and a fourth area; and successively using the Y component, the U component and the V component of the 1080P YUV444 image as a Y component of the first area, a Y component of the second area and a Y component of the third area, setting U components and V components of the first area, the second area and the third area to 0, and setting a Y component, a U component and a V component of the fourth area to 0, so as to make the target image composed of the first area, the second area, the third area and the fourth area form a 4K YUV444 image.

Further, after the 4K YUV444 image is obtained, the method further comprises the following steps:

conducting YUV420 coding for the 4K YUV444 image through an H.265 coder, transmitting the 4K YUV444 image to a terminal through a network, then conducting YUV420 decoding and conducting reverse operation for the decoded image to obtain a YUV444 image.

Further, the first area, the second area, the third area and the fourth area have the same size.

Further, in the target image, based on the first area, the second area and the third area are located on two adjacent sides of the first area respectively, and the fourth area is located in an angle area surrounded by the second area and the third area.

The present application has the following beneficial effects: the present application can well implement the image coding and decoding of the 1080P YUV444 image on the basis of H.265 and improve image definition.

DESCRIPTION OF DRAWINGS

FIG. 2 is a schematic diagram of a relation of a first area, a second area, a third area and a fourth area in a target image.

DETAILED DESCRIPTION

Figure 1:
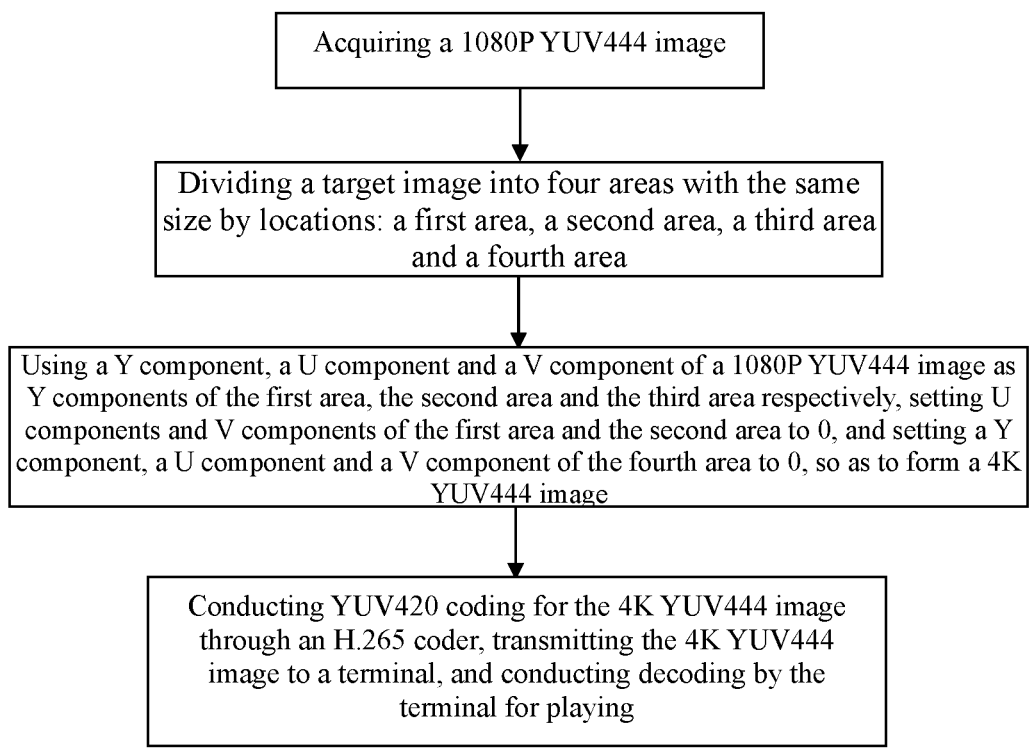
FIG. 1 is a flow chart of a preferred embodiment.

The present application is further described below in combination with drawings and specific embodiments.

As shown in FIG. 1 and FIG. 2, a method for implementing coding and decoding of a YUV444 image on basis of H.265 comprises the following steps:

acquiring a YUV444 image with a resolution of 1920*1080 (1080P for short), and extracting a Y component, a U component and a V component from the YUV444 image with a resolution of 1080P.

For the YUV444 image, each pixel point in the image comprises 3 parts: a Y component, a U component (also called Cb component) and a V component (also called Cr component). The YUV444 image with a resolution of 1080P has 1920*1080 pixel points. Therefore, the Y component split from the YUV444 image with a resolution of 1080P is a sum of Y components of all pixel points, and the same is true for the U component and the V component which are the sum of the U components or the V components of all pixel points.

A target image is equally divided into 4 areas according to sizes; each area has the same size; and the 4 areas are denoted as a first area, a second area, a third area and a fourth area successively from left to right and from top to bottom. The target image is also a blank image, and the image has no any pixel point information and is blank. By referring to FIG. 2, based on the first area, the second area and the third area are located on two adjacent sides of the first area respectively, and the fourth area is located in an angle area surrounded by the second area and the third area. For example, the second area is located on a right side of the first area; the third area is located on a lower side of the first area; the right side and the lower side of the first area are just two adjacent sides; an angle area with an opening is just surrounded by a lower side of the second area and a right side of the third area; and the angle area with an opening is just the fourth area.

A Y component of the YUV444 image with a resolution of 1080P is filled in the first area as a Y component of the first area, and a U component and a V component of the first area are set to 0. A U component of the YUV444 image with a resolution of 1080P is filled in the second area as a Y component of the second area, and a U component and a V component of the second area are set to 0. A V component of the YUV444 image with a resolution of 1080P is filled in the third area as a Y component of the third area, and a U component and a V component of the third area are set to 0. A Y component, a U component and a V component of the fourth area are set to 0.

The target image formed by the first area, the second area, the third area and the fourth area is an obtained YUV444 image with a resolution of 4K. YUV420 coding is conducted for the YUV444 image with a resolution of 4K through an H.265 coder; the YUV444 image is transmitted to a terminal through a network, then the terminal conducts YUV420 decoding; and reverse operation is conducted for the decoded image to obtain a YUV444 image, so as to play the image on the terminal. Thus, the coding and decoding of YUV444 can be implemented through the coding and decoding of YUV420 with low cost, and image quality is improved.

In this step, since the H.265 coder codes and decodes the 4K image, the YUV444 image with a resolution of 4K needs to be inputted.

Wherein the reverse operation means that three Y components extracted from the first area, the second area and the third area respectively are used as the Y component, the U component and the V component of the decoded YUV444 image successively, so as to synthesize a YUV444 image, thereby obtaining the decoded YUV444 image.

The present embodiment can well implement the image coding and decoding of the 1080P YUV444 image on the basis of H.265 and improve image definition.

The embodiment disclosed in this description is only an example of unilateral features of the present application, and the protection scope of the present application is not limited to this embodiment. Any other functionally equivalent embodiment falls within the protection range of the present application. For those skilled in the art, various other corresponding changes and modifications can be made according to the technical solution and concept described above, and all these changes and modifications should fall within the protection scope of the claims of the present application.

What is claimed is:

1. A method for implementing coding and decoding of a YUV444 image on basis of H.265, comprising the following steps:
   acquiring a 1080P YUV444 image, and extracting a Y component, a U component and a V component from the 1080P YUV444 image;
   dividing a target image into 4 areas, wherein the 4 areas are denoted as a first area, a second area, a third area and a fourth area; and
   successively using the Y component, the U component and the V component of the 1080P YUV444 image as a Y component of the first area, a Y component of the second area and a Y component of the third area, setting U components and V components of the first area, the second area and the third area to 0, and setting a Y component, a U component and a V component of the fourth area to 0, so as to make the target image composed of the first area, the second area, the third area and the fourth area form a 4K YUV444 image.

2. The method for implementing coding and decoding of the YUV444 image on basis of H.265 according to claim 1, wherein after the 4K YUV444 image is obtained, the method further comprises the following steps:
   conducting YUV420 coding for the 4K YUV444 image through an H.265 coder, transmitting the 4K YUV444 image to a terminal through a network, then conducting YUV420 decoding and conducting reverse operation for the decoded image to obtain a YUV444 image.

3. The method for implementing coding and decoding of the YUV444 image on basis of H.265 according to claim 1, wherein the first area, the second area, the third area and the fourth area have the same size.

4. The method for implementing coding and decoding of the YUV444 image on basis of H.265 according to claim 1, wherein in the target image, based on the first area, the second area and the third area are located on two adjacent sides of the first area respectively, and the fourth area is located in an angle area surrounded by the second area and the third area.

5. The method for implementing coding and decoding of the YUV444 image on basis of H.265 according to claim 3, wherein in the target image, based on the first area, the second area and the third area are located on two adjacent sides of the first area respectively, and the fourth area is located in an angle area surrounded by the second area and the third area.

* * * * *